United States Patent [19]
Chen

[11] Patent Number: 5,639,192
[45] Date of Patent: Jun. 17, 1997

[54] MEANS FOR PREVENTING A DRAWER FROM BEING COMPLETELY REMOVED FROM A DRILL PRESS

[76] Inventor: Ruey Zon Chen, No. 261, Jen Hwa Rd., Tali City, Taichung, Taiwan

[21] Appl. No.: 503,766

[22] Filed: Jul. 18, 1995

[51] Int. Cl.⁶ .................................................. B23B 47/00
[52] U.S. Cl. ........................ 408/88; 408/110; 408/241 R
[58] Field of Search ........................... 408/87, 88, 89, 408/90, 91, 110, 115 R, 241 R, 236, 237, 20, 234, 99; 312/330.1, 332, 334.6, 334.14, 334.44, 334.46

[56] References Cited

U.S. PATENT DOCUMENTS

| | | | |
|---|---|---|---|
| 3,975,068 | 8/1976 | Speckin | 312/254 |
| 4,190,306 | 2/1980 | Litchfield et al. | 312/334.4 X |
| 4,349,945 | 9/1982 | Fox | 408/20 X |
| 4,384,746 | 5/1983 | Ferdinand et al. | 308/3.6 |
| 4,453,790 | 6/1984 | Cohen et al. | 312/334.44 X |
| 4,582,105 | 4/1986 | Wolff | 408/90 X |
| 4,780,030 | 10/1988 | Zudall | 408/234 X |

*Primary Examiner*—M. Rachuba
*Assistant Examiner*—Henry W. H. Tsai
*Attorney, Agent, or Firm*—Morton J. Rosenberg; David I. Klein

[57] ABSTRACT

A drill press having an assembly for preventing a drawer from being completely removed from a drill press. The drill press has a base in which the drawer is received, the base having an opening formed between two side portions of a bottom member of the base. Each of the side portions has a plate fixedly engaged thereto with a part of the plate extending into the opening and having an aperture formed therein. A positioning element is fixedly engaged to each plate and has an extension extending through the aperture. The extension of each positioning element has a first and a second inclined surface formed on a top end thereof. The drawer has a first stop and a second stop laterally extending from each of the two sides thereof, wherein the first stop is shorter than that of the second stop and the drawer is stopped by the second stop being blocked by the extension of the positioning element.

3 Claims, 3 Drawing Sheets

1

MEANS FOR PREVENTING A DRAWER FROM BEING COMPLETELY REMOVED FROM A DRILL PRESS

BACKGROUND OF THE INVENTION

1. Field of Invention

The present invention relates to a means and, more particularly, to a means for preventing a drawer from being completely removed from a base of a drill press.

2. Related Prior Art

A drill press has a base on which a bench is disposed and a drill mechanism is disposed to the bench so as to drill a hole through an object, for example, which is disposed on the bench. Generally, there has a drawer disposed in the base for tools or drills or cutters to be received therein, however, the drawer needs a suitable means to prevent the drawer from being completely removed from the base, because such tools, drills or cutters are disposed in a certain order the drawer and more important that they are sharp, therefore, should the drawer is completely removed from the base unintentionally, then the sharp drills or the cutters could hurt the operator.

The present invention intends to provide a means which has a simple structure and the means has a function of preventing the drawer from being completely removed from the base of the drill press so as to mitigate and/or obviate the above-mentioned problems.

SUMMARY OF THE INVENTION

The present invention provides a means for preventing a drawer from being completely removed from a drill press, the drawer is received in a base of the drill press, the base has an opening defined in a bottom thereof and the opening defined by two side portions, each of the side portions having a plate fixedly engaged thereto and a part of the plate extending into the opening and which has an aperture defined therein, the drawer slidably moved on the two parts of the two plates, a positioning element fixedly engaged to the plate and having an extension extending through the aperture, the extension having a first and a second inclined surfaces formed on a top thereof, the drawer has a first stop and a second stop respectively and laterally extending from each of two sides thereof wherein the first stop is shorter than that of the second stop and the drawer is stopped by the second stop contacting the inclined surface of the positioning element.

It is an object of the present invention to provide a means disposed to a drill press and which prevents a drawer received in a base of the drill press from being completely removed from the base.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
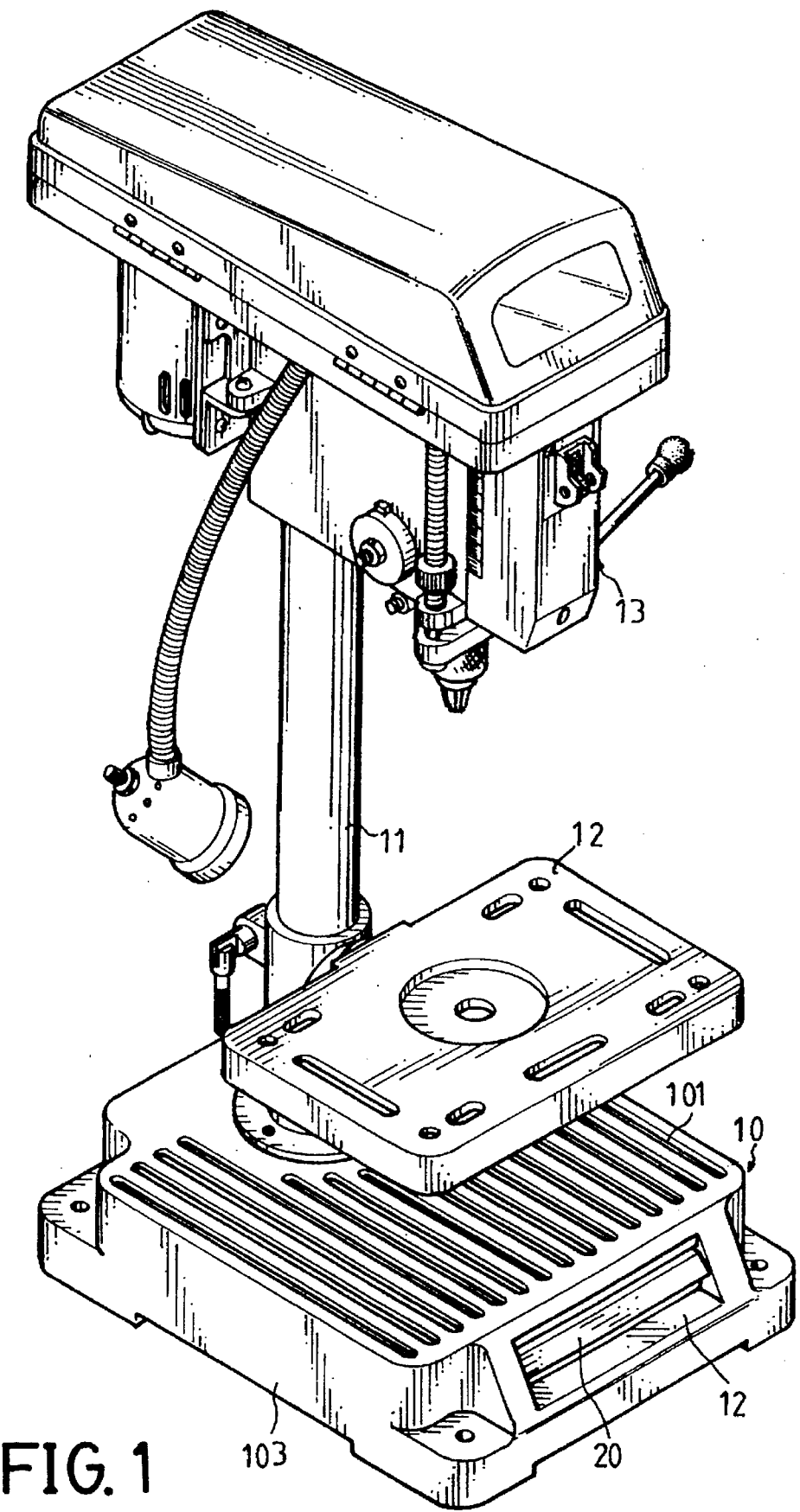
FIG. 1 is a perspective view of a drill press having a drawer received in a base in accordance with the present invention.
Figure 2:
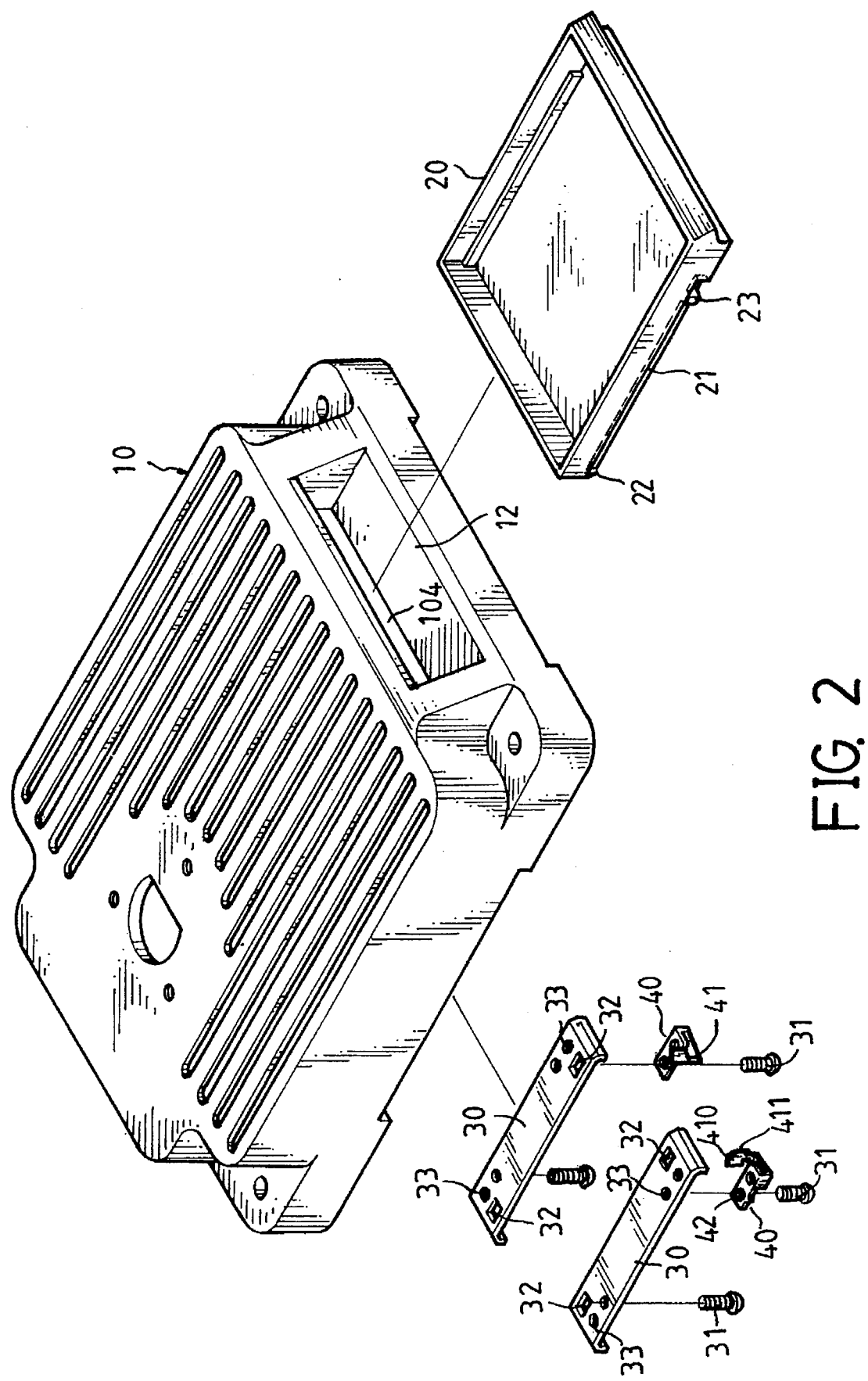
FIG. 2 is an exploded view of a base of the drill press, a drawer, two plates and two positioning elements in accordance with the present invention.
Figure 3:
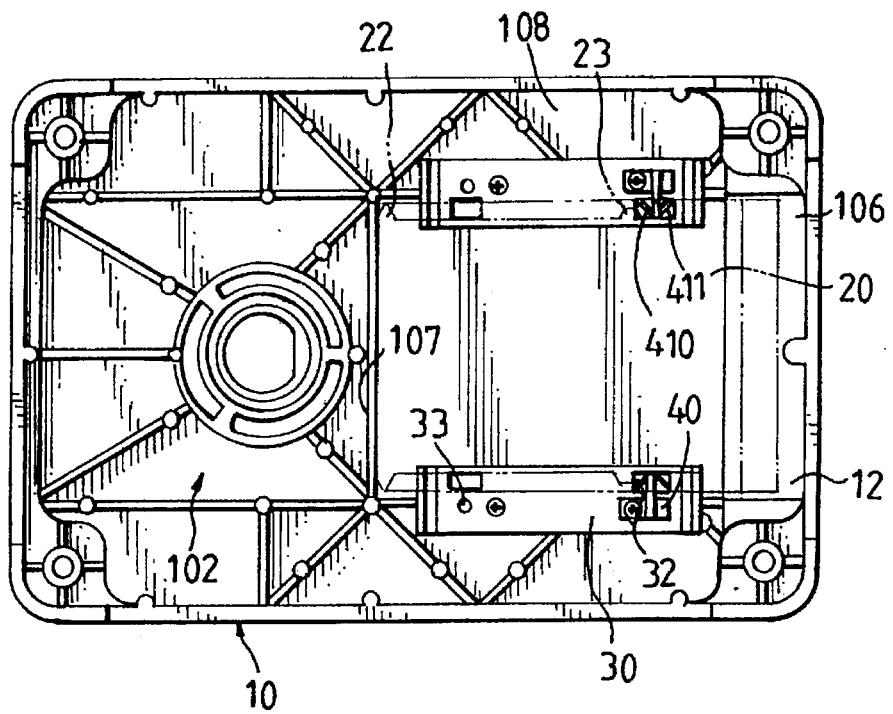
FIG. 3 is a bottom plane view of the base in which the drawer is received in accordance with the present invention.
Figure 4:
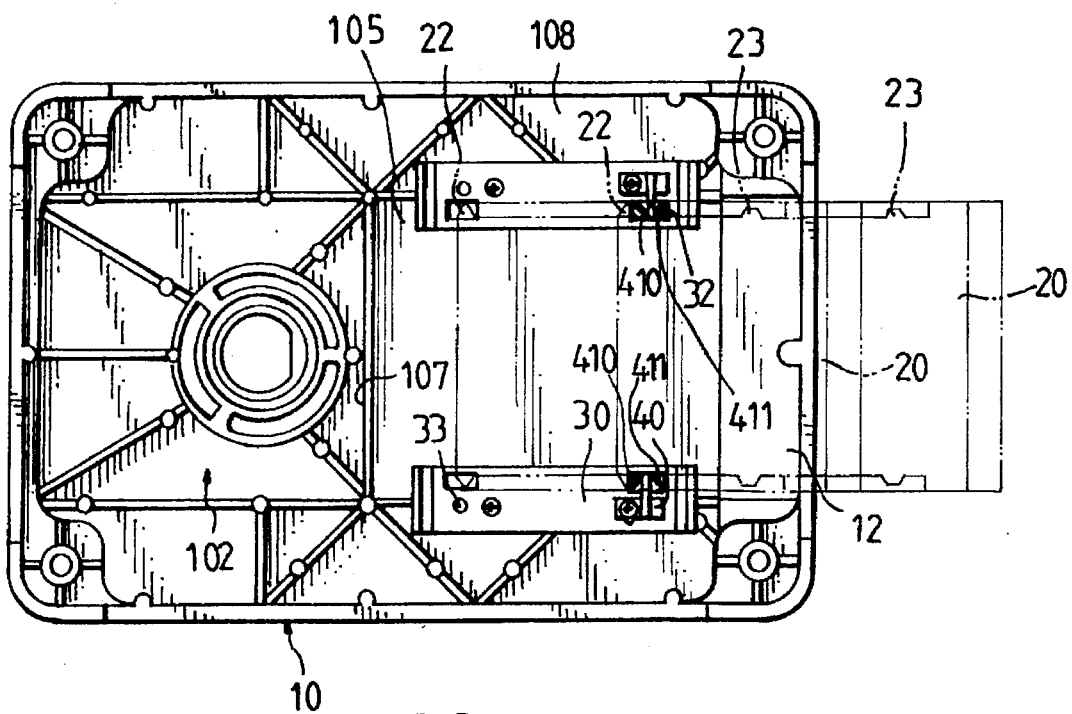
FIG. 4 is a view similar to FIG. 3 wherein the drawer is pulled out and is stopped by a second stop contacting a first inclined surface of the positioning element.

Referring to the drawings of FIGS. 1 through 4, the drill press has a base 10, a column 11 extending upwardly from the base 10, a bench 12 slidably disposed to the column 11 and a drill mechanism 13 disposed to a top of the column 11, the base 10 having an upper board 101, a bottom board 102 (FIGS. 3 and 4) and side walls 103 connected between the upper board 101 and the bottom board 102, a slot 104 deflated in a front surface of the side walls 103 for a drawer 20 inserted therefrom. An opening 105 is defined in the bottom board 102 and communicates with the slot 104, the bottom board 102 having a front portion 106, a rear portion 107 and two side portions 108 so as to define the opening 105.

Two plates 30 each of which has a first end and a second end, each of the first end and the second end having two first holes 33 and an aperture 32 defined therein, the first holes 33 and the aperture 32 located in a direction perpendicular to a longitudinal axis of the plate 30. A positioning element 40 is a short plate which has two second holes 42 defined therein corresponding to the first holes 33 of the plate 30 and an extension 41 extending upwardly from a side of the positioning element 40, the extension 41 having a first inclined surface 410 and a second inclined surface 411 respectively formed on a top thereof. The plate 30 is fixedly engaged to each of the side portions 108 of the bottom board 102 by extending a bolt 31 respectively through the second holes 42 of the positioning element 40, the finest holes 33 of the plate 30 and then threadedly engaging to the side portion 108 such that a part of the plate 30 which has the aperture 32 defined therein extends into the opening 105 and the aperture 32 communicates with the opening 105 of the bottom board 102 and the extension 41 extending out from the aperture 32 near the slot 104 of the base 10.

The drawer 20 has two sides 21, each of the sides 21 having a first end and a second end, the first end thereof having a first stop 23 extending laterally therefrom and the second end thereof having a second stop 22 extending laterally therefrom, the first stop 23 is shorter than that of the second stop 22. The drawer 20 is inserted from the slot 104 and slidably moved on the two plates 30 extending into the opening 105, the first stop 23 slidably moved across the first inclined surface 410 of the positioning element 40 by pulling the drawer 20 out from the slot 104 and the drawer 20 is stopped by the second stop 22 contact the first inclined surface 410. When pushing the drawer 20 in the base 10, the first stop 23 is slidably moved across the second inclined surface 411 and the drawer 20 is received in the base 10.

Accordingly, the drawer 20 is received in the base 10 and will not completely be removed from the base 10 in normal use such that the invention meets the need described above.

Although the invention has been explained in relation to its preferred embodiment, it is to be understood that many other possible modifications and variations can be made without departing from the spirit and scope of the invention as hereinafter claimed.

I claim:

1. A drill press having means for preventing a drawer from being completely removed therefrom, said drill press comprising:

a drawer having a pair of opposing sides, each of said drawer sides having a front end and a rear end;

a base adapted to receive said drawer, said base having (a) an upper board, (b) a bottom board, and (c) a plurality of side walls extending between said upper and bottom boards; said base having a slot formed through one of said plurality of side walls for receiving said drawer therein, said bottom board having an opening formed therein in open communication with said slot and bounded by a front portion, a rear portion and two side portions of said bottom board;

a column extending upwardly from said base a bench slidably disposed on said column;

a drill mechanism coupled to said column;

a pair of longitudinally extended plates respectively secured to said two side portions of said bottom board, each of said pair of plates having a first end and an opposing second end, each of said first and second ends having at least one first hole formed therethrough and an aperture formed therethrough and spaced from said at least one first hole in a direction perpendicular to said longitudinal direction;

a pair of positioning elements respectively coupled to said pair of extended plates, each of said pair of positioning elements being formed as a short plate having at least one second hole formed therethrough disposed in corresponding relationship to said first hole of a respective extended plate and an extension extending upwardly from a side of said positioning element to pass through said aperture in a respective end of said respective extended plate, said extension having a first inclined surface and a second inclined surface formed on a top end thereof, each of said extended plates being fixedly engaged to a respective one of said two side portions of said bottom board by a bolt threadedly secured to said side portion of said bottom board and passing through said second hole of a respective positioning element and and a respective first hole of said extended plate with said extension of said respective positioning element extending into said opening of said bottom board adjacent said slot of said base; and each of said sides of said drawer having a first stop extending laterally therefrom adjacent said front end thereof and a second stop extending laterally therefrom adjacent said rear end of said drawer side, said drawer being disposed through said slot into said opening of said bottom board and slidably displaceable on said two extended plates extending into said opening of said bottom board, each said first stop being adapted to be slidably displaceable across said first and second inclined surfaces of a respective positioning element responsive to said drawer being outwardly displaced from said slot, each said second stop being adapted to be blocked by a respective positioning element for limiting said outward displacement of said drawer.

2. The drill press as recited in claim 1 wherein said first stop is dimensionally smaller than said second stop of said drawer.

3. A means for preventing a drawer from being completely removed from a drill press, said drill press having a base, a column extending upwardly from said base, a bench slidably disposed to said column and a drill mechanism disposed to said column, said base having an upper board, a bottom board and side walls connected between said upper board and said bottom board, a slot defined in one of said side walls for a drawer inserted therefrom, an opening defined in said bottom board and communicating with said slot and said bottom board having a front portion, a rear portion and two side portions so as to define said opening;

a pair of plates, each of said plates having a first end and a second end, each of said first end and said second end having at least one first hole and an aperture defined therein, said first hole and said aperture located in a direction perpendicular to a longitudinal axis of said plate, a positioning element being a short plate which has at least one second hole defined therein corresponding to said first hole of said plate and an extension extending upwardly from a side of said positioning element, said extension having a first inclined surface and a second inclined surface defined on a top thereof, said plate fixedly engaged to each of said two side portions of said bottom board by extending a bolt respectively through said second holes of said short plate, said first holes of said plate and then threadedly engaging to said side portion such that a part of the plate, having said aperture defined therein, extending into said opening and said aperture communicating with said opening of said bottom board and said extension extending out from said aperture near said slot of said base; and the drawer having two sides, each of said sides having a first end and a second end, said first end thereof having a first stop extending laterally therefrom and said second end thereof having a second stop extending laterally therefrom, said first stop being shorter than that of said second stop, said drawer inserted from said slot and slidably moved on said two parts of said two plates extending into the opening, said first stop slidably moved across said first inclined surface of said positioning element by pulling said drawer outwardly from said slot and said drawer being stopped by said second stop contacting said first inclined surface.

* * * * *